United States Patent [19]

Laird et al.

[11] Patent Number: 4,632,876
[45] Date of Patent: Dec. 30, 1986

[54] CERAMIC SPHEROIDS HAVING LOW DENSITY AND HIGH CRUSH RESISTANCE

[75] Inventors: James A. Laird, St. Joseph, Wis.; Warren R. Beck, St. Paul, Minn.

[73] Assignee: Minnesota Mining and Manufacturing Company, St. Paul, Minn.

[21] Appl. No.: 743,980

[22] Filed: Jun. 12, 1985

[51] Int. Cl.$^4$ ............................................. B05D 7/00
[52] U.S. Cl. ................................... 428/404; 428/403; 428/407; 501/89
[58] Field of Search ...................... 428/404, 403, 407; 501/89

[56] References Cited

U.S. PATENT DOCUMENTS

| | | | |
|---|---|---|---|
| 2,123,536 | 7/1938 | Long | 49/77 |
| 2,566,117 | 8/1951 | Christie, Jr. et al. | 117/100 |
| 2,699,409 | 1/1955 | Hashimoto | 117/100 |
| 3,207,588 | 9/1965 | Slayter et al. | 65/21 |
| 3,354,024 | 11/1967 | Deustachio et al. | 161/168 |
| 3,486,706 | 12/1969 | Weyand | 241/184 |
| 3,505,089 | 4/1970 | Rostoker | 106/40 |
| 3,657,847 | 4/1972 | Castellucci | 51/313 |
| 3,666,506 | 5/1972 | Cowan et al. | 106/41 |

FOREIGN PATENT DOCUMENTS

| | | |
|---|---|---|
| 1117987 | 2/1982 | Canada . |
| 87852 | 9/1983 | European Pat. Off. . |
| 101855 | 3/1984 | European Pat. Off. . |
| 116369 | 8/1984 | European Pat. Off. . |
| 2921336 | 12/1979 | Fed. Rep. of Germany . |
| 2037727 | 7/1980 | United Kingdom . |
| 2090275 | 7/1982 | United Kingdom . |

OTHER PUBLICATIONS

Ries, H. B., "Build-Up Granulation (Pelletization)", published by Maschinenfabrick Gustav Eirich.

*Primary Examiner*—George F. Lesmes
*Assistant Examiner*—S. A. Gibson
*Attorney, Agent, or Firm*—D. M. Sell; J. A. Smith; D. B. Little

[57] ABSTRACT

Ceramic spheroids having:

A. a core made by firing raw materials comprising about:

50-99.8 parts by weight mineral particulates;
0.1 to 50 parts by weight silicon carbide; and
0.1 to 15 parts by weight binder (e.g. bentonite); and B. an outer shell comprising $Al_2O_3$ or MgO.

More alumina or magnesium oxide is contained in the outer shell than in the core. The core of the ceramic spheroid has closed cell microporosity. The inventive spheroids are characterized by a density less than 2.2 g/cc and can be readily made to have a density less than 1 g/cc. These ceramic spheroids combine high strength (due to the tough outer shell) with low density (due to the closed cell microporosity) and have applications (among others) as buoyant water filtration media and low density fillers.

6 Claims, 2 Drawing Figures

CERAMIC SPHEROIDS HAVING LOW DENSITY AND HIGH CRUSH RESISTANCE

TECHNICAL FIELD

This invention is related to ceramic spheroids having utility, among others, as filter media.

BACKGROUND

Known low density ceramic particles, such as cellulated glass particles, are either weak or will absorb fluid with time. Plastic coatings may alleviate these problems, although such coatings are themselves uneconomical and are not useful at elevated temperatures.

Commercially available glass microbubbles are generally limited to a maximum particle size of about 180 micrometers; while other low density ceramic particles usually are not available in sizes smaller than 840 micrometers.

There is a need for strong low density ceramics which will not absorb fluid over time and yet which avoid the high temperature instability problems of plastic coatings. There is also a need for such spheroids in the size range of 180 to 840 micrometers. Some applications for low density, high strength ceramic spheroids are proppants, fillers for low density plastics, filter media, and in linings for smoke stacks.

DISCLOSURE OF INVENTION

The needs mentioned above have been met by fired ceramic spheroids:

A. having a core:
 1. made from raw materials comprising about: 50 to 99.8 parts by weight mineral particulates,
 0.1 to 50 parts by weight silicon carbide, and
 0.1 to 15 parts by weight binder;
 2. wherein the mineral particulates comprise a mineral mixture which has a fired density of less than about 2.9 grams per cubic centimeter when fired above about 1100° C. and includes at least one mineral having chemically bound water or sulphur in a form which is not substantially water soluble in amounts sufficient to yield 0.5 to 5.0 weight percent water or 0.04 to 2.0 weight percent sulfur in the total mass of mineral particulates;
 3. wherein the binder is characterized by adhering the raw materials together after they are converted to spheroids but before they are fired;
 4. said core having a plurality of closed air cells; and
B. An outer shell, surrounding the core, comprising a metal oxide selected from aluminum oxide and magnesium oxide;
said fired ceramic spheroids having a fired density less than about 2.2 grams per cubic centimeter.

Silicon carbide crystals may be either present or absent in the shell surrounding the core, but if present, silicon carbide is in lower concentration in the shell than in the core. The metal oxide is in lower concentration in the core than it is in the outer shell.

For purposes of this description, the term "mineral particulate(s)" means the mineral mixture which is an ingredient of the inventive ceramic composition, and the term "ceramic spheroid(s)" refers to the fired inventive composition. The term "fired density" as used above means the specific gravity of the ceramic spheroids after they have been manufactured by firing the raw material and cooling back to ambient temperature. "Chemically bound" means chemically a part of the mineral and capable of being released upon dissociation of the mineral at or about red heat. An example of chemically bound water is water of hydration. An example of chemically bound sulfur is sulfur atoms which are part of the mineral compound or crystal lattice. The term "substantially water soluble" as applied to chemically bound sulfur means having a solubility in water at room temperature similar to or greater than that of sodium sulfate and potassium sulfate.

The inventive ceramic spheroids have a closed cell microporosity which accounts for their specific gravity being less than 2.2 grams per cubic centimeter. The diameter of the inventive ceramic spheroids is usually about 0.2 to 5 mm., and they usually have a Krumbein roundness of 0.8 or higher. The inventive ceramic spheroids exhibit excellent resistance to highly acidic or alkaline environments, such as wet gypsum and Portland cement, and they can be made to have suprisingly high crush resistance per unit weight. Such fired spheroids can be made to float indefinitely on water.

One process for making the ceramic spheroids consists of mixing the raw materials with water, spheroidizing, drying, screening, firing and screening.

An economic advantage of these ceramic spheroids over those of the prior art exist because the raw materials used for the mineral particulates and the silicon carbide may be coproducts of manufacturing roofing granules and abrasives respectively, thus being available at low cost. Other advantages are their chemical inertness, toughness and fire resistance.

Some of the uses for the inventive ceramic spheroids include: proppants for oil and gas wells, additives to oil well cements, filtration media for waste water clarification (packed filters), abrasives, syntactic foams, thermal and acoustical insulation such as cryogenic insulation, and fillers in plaster, concrete, plastics and ceramic products.

DETAILED DESCRIPTION

Figure 1:
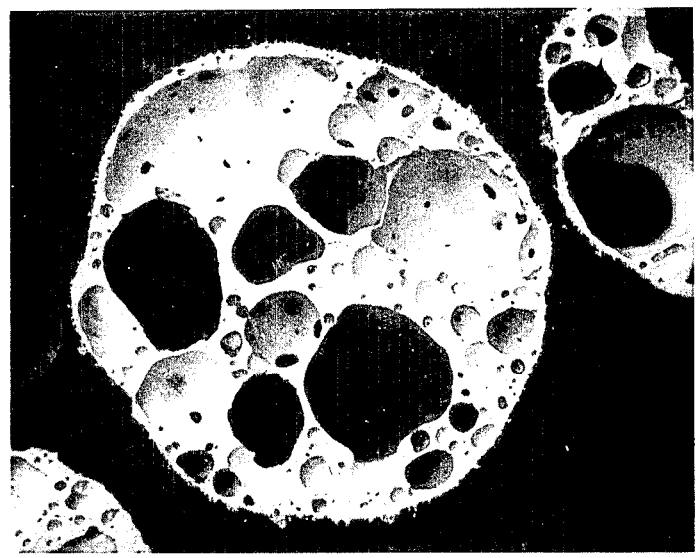
FIG. 1 is a photomicrograph of a cross section of a ceramic spheroid of this invention taken with a scanning electron microscope (SEM) at 100X magnification.

The inventive ceramic spheroids are made by a process comprising several steps. In the first step, binder, silicon carbide, mineral particulate, and optionally $Al_2O_3$ (e.g. 3 to 15 parts by weight), and water are mixed and spheroidized in order to form unfired spheroids. One example of a suitable mineral particulate contains: 60% orthoclase, 10% nepheline, 10% hornblende, 5% diopside, 15% accessory minerals (titanite, apatite, magnetite and biotite) and trace amounts of secondary minerals (e.g. kaolinite and analcite). Another example contains approximately: 75% plagioclase and orthoclase feldspar and 25% of the minerals pyroxene, hornblende, magnetite and quartz of which magnetite is less than 5%. Byproduct mineral fines of perlite (containing 2-5% chemically bound water) will also function as the mineral particulate. Minerals containing chemically bound water or sulfur which are useful components of the mineral particulate are: hornblende, apatite, biotite, pyrite, vermiculite and perlite.

Although the description that follows refers mainly to the first mineral mixture mentioned above, other mineral particulates may be utilized in a similar manner. However, blast furnace slags, power plant slags and flyash can be used but generally are not acceptable because their high iron oxide contents result in high densities. Iron oxide content of the mineral particulate should be substantially less than 9 weight percent, preferably less than 5%.

The mineral particulate material used in the research and development which led to the present invention had a specific gravity of about 2.6, and was obtained from Minnesota Mining and Manufacturing Company.

Typical binders useful as raw materials in this invention are bentonite (preferably sodium bentonite), starch, polyvinyl alcohol, cellulose gum, polyvinyl acetate and sodium lignosulphonate. Binders having high sodium concentrations, such as sodium hydroxide and sodium silicate, decrease the crush resistance of the final product.

Silicon carbide raw material may conveniently be obtained as coproduct fines (less than 8 micrometers particle size) from the manufacture of silicon carbide abrasive products. It could alternatively be formed in situ, such as by adding a polycarbosilane solution to the mineral mixture which would convert into SiC during processing.

Several types of mixing equipment may be applied in the first step., e.g., balling pans or disk spheroidizing machines may be used. Machines known as high energy mixers are well suited to this application. Two examples of such machines are the Littleford mixer and the machine known as the Eirich Machine. The Eirich machine is described in U.S. Pat. No. 3,690,622. This machine comprises basically a rotatable cylindrical container (commonly called the pan), the central axis of which is at an angle to the horizontal, one or more deflector plates, and at least one rotatable impacting impeller usually located below the apex of the path of rotation of the cylindrical container. The rotatable impacting impeller engages the material being mixed and may rotate at a higher angular velocity than the rotatable cylindrical container itself.

There are four basic steps in making the unfired spheroids in a high energy mixer: (1) mixing the dry powders at high speed rotation of the pan and impacting impeller; (2) nucleation at which time water is added to the region of the mixer near the impacting impeller to be dispersed into droplets; (3) growth of the spheroids in the manner of a snow ball with the powder agglomerating during which time the impacting impeller rotates at a slower speed than it did during the nucleation step; and (4) polishing or smoothing the surfaces of the spheroids by turning off the impacting impeller and allowing the pan to rotate, similar to a balling pan. Polishing is optional.

The amount of binder generally comprises about one to five weight percent of the dry materials fed to the mixer and is generally sufficient to permit screening and handling of the spheroids without significant attrition or breakage.

The wet spheroids are discharged from the mixer and dried at a temperature of about 40° C. to 200° C. The dried spheroids are then typically screened to obtain a mesh size of 150 micrometers to 5 mm. for further processing. The particle size range selected is actually smaller than the desired end product because of the growth of the spheroids during firing.

The dried spheroids are next mixed with a parting agent which is typically alumina. The functions of the parting agent are to: (1) prevent the dry spheroids from clustering together or adhering to the kiln wall during firing, (2) provide improved strength, (3) control surface electrical charge, (4) control surface roughness and abrasiveness, and (5) provide improved chemical resistance. The dry spheroids and parting agent may be mixed in a tumbling mixer such as a twin shell mixer or a cement mixer. If the larger particle size (e.g., 425 micrometers) parting agents are used, the parting agent and the dry spheroids need not be premixed before the firing step. The amount of parting agent usually ranges from 3 to 50 weight percent of the material fed to the kiln. Magnesium oxide, zircon, diaspore and high alumina clays are also useful parting agents.

In the development of this invention, the following metal oxides were used: alumina (less than 45 micrometers particle size obtained as A-2 alumina from Alcoa), magnesium oxide obtained as M-51 MgO from Fisher Scientific Company, and zircon (less than 45 micrometers particle size obtained from NL Industries). Aluminum and magnesium salts which convert to oxides at elevated temperatures (e.g. $Al(OH)_3$ and $MgCO_3$) may be substituted for $Al_2O_3$ and MgO in mole equivalent amounts. Although the description which follows deals mostly with alumina parting agent, the other parting agents could be used in proportions, by volume, and in particle sizes similar to the alumina.

The particle size distribution of the parting agent depends on the desired end product. Strength is achieved by using alumina of very small particle size (less than 10 micrometer average); whereas, surface roughness for water filtration is achieved by using coarser sizes. For an abrasive, the parting agent may be grit size as large as 425 micrometers.

The next step is to feed, typically by means of a vibratory feeder, the mixture of parting agent and dry spheroids to a rotary kiln. Firing may be done statically, but a rotary kiln is the preferred apparatus for this step. Other firing equipment such as a fluidized bed kiln, vertical kiln or plasma torch may be used. The residence time of the spheroids in a rotary kiln is dependent upon several parameters: kiln length, diameter, angle, and rotational speed, feed rate to the kiln, temperature within the kiln, gas atmosphere, and diameter of the spheroids. Residence time and temperature are adjusted to achieve the desired properties with each specific formulation for a given end use. With a typical residence time in a rotary kiln of 20 minutes or more, increasing the kiln temperature results in decreasing fired density and crush resistance of the spheroids. Firing temperature is typically above 1100° C.

In this process, the ceramic spheroids are actually overfired. That is, they are heated to a temperature higher and for a time longer than required to reach maximum crush resistance. This overfiring allows for the formation of the internal air cells, making the finished product less dense.

The firing atmosphere is air. The silicon carbide in the spheroids is oxidized during firing, the SiC near the surface being more extensively oxidized than that in the core.

Some of the metal oxide parting agent (alumina or magnesium oxide) becomes part of the spheroids during the firing step. Metal oxide (e.g. $Al_2O_3$ or MgO) or a metal oxide precursor (e.g. $MgCO_3$ or $Al(OH)_3$ which converts to the metal oxide during firing) is incorporated into the spheroids as they pass through the kiln. Higher kiln firing temperatures result in a thicker shell of parting agent on the spheroids. The coarser the particle size of the mineral particulate in the composition, the higher the required temperature, and more metal oxide is absorbed into the spheroids during firing to be purely exemplary. In the examples, the particle size distributions of the various raw materials, as measured by a Leeds & Northrup Microtrac Analyzer, are shown in Table 1.

TABLE 1

| | Particle Size Distributions of Raw Materials (in micrometers) | | | | | | | |
|---|---|---|---|---|---|---|---|---|
| | Mineral Particulate | | Nepheline Syenite | $Al_2O_3$ | | | | |
| | LR No. 1 | LR No. 2 and W | (Apex 700) | Fine | Coarse | SiC | MgO | Zircon |
| 90% of sample below size | 27 | 10 | 11 | 17 | 133 | 8 | 108 | 37 |
| 50% of sample below size | 9 | 4 | 4 | 7 | 80 | 4 | 44 | 13 |
| 10% of sample below size | 3 | 2 | 2 | 3 | 41 | 2 | 16 | 3 | form an outer shell rich in metal oxide concentration. Also, finer particle size distribution of the parting agent allows more metal oxide to be absorbed into the spheroids.

The product from the kiln is screened to obtain the desired particle size fraction, usually about 4 to 80 mesh (5 mm. to 180 micrometers). Either before, during or after this screening step, the fired spheroids may be subject to vigorous agitation by air or some other agitation means or to a water washing step in order to remove dust from their surfaces.

Various properties of the ceramic spheroids are measured and reported. Specific gravity is determined according to ASTM Standard D-2840-69 by weighing a sample, measuring the volume of the sample with an air comparison pycnometer (Beckman Instruments Model 930) and calculating the weight per cubic centimeter. Bulk density is measured by gently pouring a sample into a graduate cylinder, recording sample weight, and calculating weight per cubic centimeter (cc.).

Crush resistance indicates how the ceramic spheroids would perform the function of a proppant, propping up a subterranean rock formation, and resisting the crushing pressure of the formation. Crush resistance is measured by placing a 2.54 cm. deep sample of 1.19/0.85 mm. ceramic spheroids into the 2.54 cm. internal diameter die cavity of a test apparatus. A steel piston applies pressure to the ceramic spheroids inside the cavity at a rate of 1.25 cm. per minute to achieve the test pressure of 400 psi (2.7 MPa) after which the pressure is immediately released. The sample is screened between 20 and 30 mesh (0.85 and 0.59 mm.) screens (the next standard screen sizes smaller than the original sample) for 5 minutes on a Rotap screen vibrator, and the percentage of fines less than 0.59 mm. in largest dimension is recorded. In order to report crush resistance on an equal basis for all samples, the weight of the sample used in calculating percent fines is based upon the bulk density (which may vary) of the original sample. It is desired to minimize the weight percent fines produced in the crush resistance test.

If the original sample is of a different particle size, the same basic procedure is used with different screens. For example, a sample of 0.85/0.59 mm. particle size spheroids would be subjected to the test and then screened between 0.59 and 0.42 mm screens, counting the fines as particles less than 0.42 mm in size. The higher the percentages of fines produced, the lower is the crush resistance.

The invention will be further clarified by a consideration of the following examples, which are intended to

EXAMPLE I

A dry ceramic mix of: 6,504 g mineral particulate (LR No. 1) 238.35 grams bentonite obtained as Yolclay 200 bentonite from American Colloid Company; and 68.1 g. SiC was blended for three minutes in a mixer (Eirich Machines, Inc., Model Rv02) with the cylindrical container rotating at about 66 rpm and the impacting impeller rotating at the high speed setting of 2,230 rpm. Then 1,100 ml. of water was added over a period of about 30 seconds. After the mixer ran an additional 8.5 minutes (nucleation time), the impacting impeller speed was reduced to 1,115 rpm, for about 2.5 minutes (build time), after which the rotation of the cylindrical container was stopped.

The batch was dried for 4 hours at about 125° C. in an oven. The dried spheroids were screened to obtain 16/30 mesh (1.19/0.59 mm.) fraction. Then 400 grams of that fraction of the unfired spheroids were mixed with 133 grams of fine alumina powder. Mixing was accomplished by tumbling the ingredients in a jar by hand.

The mixture was fed into a rotating tube kiln about 1,400 mm. long and having about 64 mm. internal diameter, rotating at about 4 rpm and inclined at a two degree angle. The spheroids in the kiln were estimated to be at 1160° C. for about 18 minutes.

The fired spheroids discharged from the kiln, 16/20 mesh (1180/840 micrometer) fraction, comprised brown ceramic spheroids having a tough exterior shell and a specific gravity of 0.84. The essentially zero drift with time of the pycnometer gauge verified the fact that most of the cells in the fired spheroids were air tight. The bulk density of the ceramic spheroids was 0.43 g/cc., and all of the spheroids floated on water. Crush resistance of the 1180/840 micrometer fraction was 25% (i.e. 25% was crushed to fines).

Figure 2:
FIG. 2 is a photomicrograph of a portion of the ceramic spheroid of FIG. 1, showing the outer shell, taken with an SEM at 1000X magnification.

The scanning electron photomicrographs of FIGS. 1 and 2 depict cross-sections of ceramic spheroids of Example I. FIG. 1 shows the core having air cells or microporosity, and the outer shell containing tiny alumina crystals. It can be seen that the air cells are not interconnected but rather are distinct, closed cells. FIG. 2 depicts the outer shell in more detail, showing the alumina crystals. The thickness of the outer shell measures roughly 5 micrometers (average), according to the photomicrographs.

Thermal stability of the ceramic spheroids was such that density was unaffected by storage at 700° C. for several days.

EXAMPLES II-XII

The same procedure described above for Example I was used in the preparation and evaluation of Examples II–XII. The raw materials used to make the spheroids (in parts by weight) are given in Table 2 below.

TABLE 2

Mixer Batch Formulations in Parts by Weight

| Example | Mineral Particulate LR* No. 1 | Mineral Particulate LR* No. 2 | W* | Nepheline Syenite Apex** 700 | SiC | Al₂O₃ | Bentonite | H₂O | NaOH |
|---|---|---|---|---|---|---|---|---|---|
| II | 96.4 | | | | 0.1 | | 3.5 | 17.6 | |
| III | 96.0 | | | | 0.5 | | 3.5 | 17.6 | |
| IV | 94.5 | | | | 2.0 | | 3.5 | 16.9 | |
| V | 92.5 | | | | 4.0 | | 3.5 | 16.9 | |
| VI | 88.5 | | | | 8.0 | | 3.5 | 17.6 | |
| VII | 80.5 | | | | 16.0 | | 3.5 | 17.6 | |
| VIII | 48.25 | | | | 48.25 | | 3.5 | 17.6 | |
| IX | | 80.5 | | | 1.0 | 15 | 3.5 | 16.0 | |
| X | | 84 | | | 1.0 | | 15.0 | 16.2 | |
| XI | | | 95.5 | | 1.0 | | 3.5 | 17.0 | |
| XII | | 95.5 | | | 1.0 | | 3.5 | 18.7 | |
| Control 1 | 96.5 | | | | 0 | | 3.5 | 17.4 | |
| Control 2 | 96.5 | | | | 1.0 | | | 20.6 | 2.5 |
| Control 3 | | | | 95.5 | 1.0 | | 3.5 | 10.1 | |

*Obtained from Minnesota Mining and Manufacturing Company.
**Obtained from International Minerals and Chemical Company, Des Plaines, Illinois.

Table 3 below shows the mixer times used for each of the Examples II–XII and Controls 1–3.

TABLE 3

Mixer Times (minutes)

| Example | nucleation time pan-66 rpm impacting impeller-2,230 rpm | build time pan-66 rpm impacting impeller-1,115 rpm | polish time pan-66 rpm impacting impeller-0-rpm |
|---|---|---|---|
| II | 6 | 15 | 0 |
| III | 2.5 | 8 | 10 |
| IV | 6 | 8 | 0 |
| V | 8.5 | 8 | 0 |
| VI | 8.5 | 8 | 0 |
| VII | 8.5 | 8 | 0 |
| VIII | 6 | 8 | 0 |
| IX | 3.5 | 10 | 8 |
| X | 3.5 | 7 | 0 |
| XI | 2.5 | 8 | 3 |
| XII | 3.5 | 10 | 8 |
| Control 1 | 3.5 | 7 | 15 |
| Control 2 | 8.5 | 8 | 0 |
| Control 3 | 2.5 | 5 | 20 |

Table 4 lists the properties of the ceramic spheroids resulting from each of the Examples II–XII and Controls 1–3.

TABLE 4

Physical Properties by Size Fraction

| Example | % Al₂O₃ Parting Agent | Firing Temperature | 1.19/0.84 mm diameter specific gravity | 1.19/0.84 mm diameter bulk density (g/cc) | 1.19/0.84 mm diameter Crush Resistance % <0.59 mm | 0.84/0.59 mm diameter specific gravity | 0.84/0.59 mm diameter bulk density (g/cc) | 0.84/0.59 mm diameter Crush Resistance % <0.42 mm |
|---|---|---|---|---|---|---|---|---|
| II | 25 | 1168 | 1.08 | 0.60 | 1 | 1.15 | 0.61 | 1 |
| III | 25 | 1168 | 0.86 | 0.46 | 20 | 0.96 | 0.49 | 9 |
| IV | 20 | 1168 | 0.96 | 0.46 | 11 | 1.09 | 0.49 | 6 |
| V | 20 | 1168 | 1.18 | 0.48 | 4 | 1.27 | 0.50 | 5 |
| VI | 20 | 1168 | 1.18 | 0.44 | 3 | 1.38 | 0.51 | 4 |
| VII | 20 | 1168 | 1.33 | 0.46 | 6 | 1.42 | 0.48 | 8 |
| VIII | 25 | 1220 | 2.00 | 0.57 | 35 | 2.28 | 0.68 | 8 |
| VIII | 15 | 1168 | 2.25 | 0.79 | 15 | 2.48 | 0.80 | 2 |
| IX | 25 | 1232 | 1.05 | 0.42 | 41 | 1.10 | 0.45 | 3 |
| X | 20 | 1200 | 1.08 | 0.38 | 37 | 1.15 | 0.41 | 29 |
| XI | 20 | 1193 | 1.26 | 0.45 | 11 | 1.30 | 0.48 | 7 |
| XII | 8* | 1144 | 0.84 | 0.35 | 28 | 0.92 | 0.37 | 29 |
| Control 1 | 25 | 1168 | 2.44 | 1.38 | 0 | 2.46 | 1.39 | 0 |
| Control 2 | 25 | 1125 | 0.86 | 0.41 | 39 | | | |
| Control 3 | 20 | 1168 | 2.26 | 1.16 | 0 | 2.30 | 1.12 | 0 |

*MgO used instead of Al₂O₃

It can be seen from Table 4 that the ceramic spheroids made from 0.1% to just less than 50% silicon carbide (II-III) exhibited specific gravities and bulk densities less than those of Control 1 made without silicon carbide. It was found that increasing the amount of alumina parting agent tended to increase crush resistance. The use of high levels of bentonite binder (15% or above) and the use of sodium hydroxide (Control 2) was detrimental to crush resistance. The Apex 700 nepheline syenite of Control 3 yielded a product having substantially higher density than the other examples made with mineral particulate which was known to have minerals containing chemically bound sulphur or water. Crush strength of Example II (16/20 mesh, 1.0 mm/0.84 mm fraction) was measured as 1% (i.e. only 1 weight percent of the sample was crushed to below 0.84 mm particle size).

EXAMPLES I A-D

Variations of the ceramic spheroids of Example I were made by firing the spheroids produced in the process as described in that example with four different parting agents. These examples are designated I A-D, and the physical properties of the fired spheroids are listed in Table 5.

TABLE 5

| Example | Parting Agent | % Parting Agent Used | Firing Temperature (°C.) | Physical Properties by Size Fraction 1.19/0.84 mm diameter | | |
|---|---|---|---|---|---|---|
| | | | | specific gravity | bulk density (g/cc) | Crush Resistance % <0.59 mm |
| IA | Fine Al$_2$O$_3$ | 13.5 | 1162 | 1.15 | 0.47 | 4 |
| IB | Al(OH)$_3$ | 21.3 | 1162 | 1.28 | 0.49 | 2 |
| IC | Zircon | 27.3 | 1162 | 1.02 | 0.46 | 34 |
| ID | MgCO$_3$ | 21.1 | 1162 | 1.22 | 0.48 | 2 |

The compounds such as aluminum hydroxide and magnesium carbonate decomposed during firing to provide either alumina or magnesium oxide, respectively. The properties of the resulting fired spheroids were equal to or better than those obtained by direct addition of alumina or magnesium oxide parting agent. Magnesium oxide provides a positive surface charge on the ceramic spheroids which is advantageous for buoyant water filtration media.

One of the unique features of the inventive ceramic spheroids is the combination of low density with high strength or crush resistance. Other beneficial features are:

the ability to manufacture spheroids of a controlled surface roughness, depending upon the particle size of the parting agent used;

resistance to chemical attack and stress corrosion; and a lower permeability than most known materials.

The inventive ceramic spheroids may be coated with a colorant for decorative purposes if they are to be used as roofing granules. Also, shapes other than spheres, such as fibers or flakes, may be made of the same composition as described above.

The inventive ceramic spheroids described above may be bonded together by several means for various end uses. They may be bonded together by organic materials, such as epoxy resin, to form filters or boards. They may be bonded by inorganic materials, like sodium silicate, gypsum or cement to form exhaust mufflers, wallboards, roof tiles or other construction materials. The problem of resistance to highly alkaline environments such as Portland cement, may be solved by using a high concentration of parting agent in the outer shell to provide protection. The ceramic spheroids may be bonded together by a combination of organic or inorganic materials to form products such as fire resistant coatings for steel beams and coatings for smoke stacks.

Air stripping or absorption devices (e.g. columns) represent another field in which these ceramic spheroids may be used, specifically the larger ones (i.e. 3.36/2.38 mm diameter) as packing media.

Another potential application is a catalyst support. In this application, the surface area of the ceramic spheroids may be increased by acid leaching, followed by impregnating the leached surface with a catalyst such as platinum.

Other embodiments of this invention will be apparent to those skilled in the art from a consideration of this specification or practice of the invention disclosed herein. Various omissions, modifications and changes to the principles described herein may be made by one skilled in the art without departing from the true scope and spirit of the invention which is indicated by the following claims.

What is claimed is:

1. Fired ceramic spheroids having:
  A. a core:
     1. made from raw materials comprising about:
        a. 50 to 99.8 parts by weight mineral particulates,
        0.1 to 50 parts by weight silicon carbide, and
        0.1 to 15 parts by weight binder;
     2. wherein the mineral particulates comprise a mineral mixture which has a fired density of less than about 2.9 grams per cubic centimeter when fired above about 1100° C. and includes at least one mineral having chemically bound water or sulphur, in a form which is not substantially water soluble, in amounts sufficient to yield 0.5 to 5.0 weight percent water or 0.04 to 2.0 weight percent sulfur in the total mass of mineral particulates;
     3. wherein the binder is characterized by adhering the raw materials together after they are converted to spheroids but before they are fired;
     4. said core having a plurality of closed air cells; and
  B. an outer shell, surrounding the core, comprising a metal oxide selected from aluminum oxide and magnesium oxide;
  said fired ceramic spheroids having a fired density less than about 2.2 grams per cubic centimeter.

2. The ceramic spheroids of claim 1 having a density less than about 1 gram per cubic centimeter.

3. The ceramic spheroids of claim 1 having a size within the range of 180 and 840 micrometers.

4. The ceramic spheroids of claim 1 in which about 3 to 15 parts by weight alumina are included in the raw materials for the core of part A.

5. The ceramic spheroids of claim 1 in which the mineral particulate of part A.1 comprises a mineral selected from the group consisting of: perlite; mixtures of orthoclase, nepheline, hornblende and diopside; and mixtures of plagioclase and orthoclase feldspar containing at least one mineral selected from apatite, hornblende, biotite, pyrite, perlite and vermiculite.

6. The ceramic spheroids of claim 1 in which the binder is selected from the group consisting of bentonite, cellulose gum, starch, polyvinyl alcohol, polyvinylacetate, and sodium liginosulphonate.

* * * * *